(12) United States Patent
Yamaguchi

(10) Patent No.: US 10,857,978 B2
(45) Date of Patent: Dec. 8, 2020

(54) ELECTRONIC KEY APPARATUS, CONTROL METHOD, AND PROGRAM

(71) Applicant: KYOCERA Corporation, Kyoto (JP)

(72) Inventor: Yuya Yamaguchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/711,802

(22) Filed: Dec. 12, 2019

(65) Prior Publication Data
US 2020/0198579 A1   Jun. 25, 2020

(30) Foreign Application Priority Data

Dec. 21, 2018   (JP) .................................. 2018-239538

(51) Int. Cl.
| | |
|---|---|
| *B60R 25/24* | (2013.01) |
| *G01S 19/49* | (2010.01) |
| *B60R 25/20* | (2013.01) |
| *B60R 25/32* | (2013.01) |
| *B60R 25/33* | (2013.01) |

(52) U.S. Cl.
CPC .......... *B60R 25/245* (2013.01); *B60R 25/209* (2013.01); *B60R 25/32* (2013.01); *B60R 25/33* (2013.01); *G01S 19/49* (2013.01)

(58) Field of Classification Search
None
See application file for complete search history.

(56) References Cited

U.S. PATENT DOCUMENTS

2016/0245924 A1*  8/2016  Tanabe .................... G01S 19/34
2020/0141375 A1*  5/2020  Lee ...................... F02N 11/0811

FOREIGN PATENT DOCUMENTS

JP             6312100 B1    4/2018

* cited by examiner

*Primary Examiner* — Carlos Garcia
(74) *Attorney, Agent, or Firm* — Studebaker & Brackett PC

(57) ABSTRACT

An electronic key apparatus 100 used by a user of a vehicle in a smart entry system comprises a transceiver 110 configured to perform a radio communication with the vehicle, a sensor device including at least one of a GNSS receiver 161 and an acceleration sensor 162, and a controller 130 configured to control whether to set a transmission stop mode based on an output of the sensor device 160, the transmission stop mode being for causing the transceiver 110 to stop transmission of a radio signal used for unlocking the vehicle or starting a power source of the vehicle.

19 Claims, 8 Drawing Sheets

ELECTRONIC KEY APPARATUS, CONTROL METHOD, AND PROGRAM

RELATED APPLICATION

This application claims the benefit of Japanese Patent Application No. 2018-239538 filed on Dec. 21, 2018, the entire contents of which are incorporated herein by reference.

BACKGROUND

Technical Field

The present disclosure elates to an electronic key apparatus, a control method, and a program used in a smart entry system.

Related Art

Smart entry systems in which it is possible to perform radio communication between an electronic key apparatus possessed by a vehicle user and the vehicle, and control the vehicle (for example, locking and unlocking, engine starting) are widely used. In the smart entry system, for example, when a user presses a switch provided on a vehicle door, a radio signal is transmitted from the vehicle. The electronic key apparatus receives the radio signal from the vehicle and transmits the radio signal to the vehicle to perform door control.

In recent years, there has been a problem that a vehicle having a smart keyless entry function is stolen or intruded by a method called a relay attack. The relay attack is an unauthorized technique in which even when there is an electronic key apparatus at a distance where a radio signal from the vehicle does not reach, a malicious third party interposes a relay between the vehicle and the electronic key apparatus, and unlocks the vehicle by enabling communication between the vehicle and the electronic key apparatus.

Under such a premise, an electronic key apparatus for suppressing unintended vehicle operation due to a relay attack has been proposed. The electronic key apparatus monitors a reflected wave of a radio signal that is constantly transmitted from the apparatus, and determines that the user is stationary when the received intensity level of the received reflected wave is stable. The electronic key apparatus is configured to stop transmission of a radio signal for unlocking the vehicle in a continuous stationary state.

SUMMARY

An electronic key apparatus according to a first aspect is an electronic key apparatus used by a user of a vehicle in a smart entry system. The electronic key apparatus comprises a transceiver configured to perform a radio communication with the vehicle, a sensor device including at least one of a GNSS (Global Navigation Satellite System) receiver and an acceleration sensor, and a controller configured to control whether to set a transmission stop mode based on an output of at least one of the GNSS receiver and the acceleration sensor, the transmission stop mode being for causing the transceiver to stop transmission of a radio signal used for unlocking the vehicle or starting a power source of the vehicle. The controller is configured to detect a predetermined state based on the output of at least one of the GNSS receiver and the acceleration sensor, and set the transmission stop mode in response to detecting the predetermined state.

A method according to a second aspect is a method of controlling an electronic key apparatus used by a user of a vehicle in a smart entry system, the electronic key apparatus including a transceiver configured to perform a radio communication with the vehicle, and a sensor device including at least one of a GNSS (Global Navigation Satellite System) receiver and an acceleration sensor. The method comprises controlling whether to set a transmission stop mode based on an output of at least one of the GNSS receiver and the acceleration sensor, the transmission stop mode being for causing the transceiver to stop transmission of a radio signal used for unlocking the vehicle or starting a power source of the vehicle. The controlling includes detecting a predetermined state based on the output of at least one of the GNSS receiver and the acceleration sensor, and setting the transmission stop mode in response to detecting the predetermined state.

A non-transitory computer-readable medium according to a third aspect is a non-transitory computer-readable medium for storing a program causing the electronic key apparatus to perform the method according to claim 18.

DETAILED DESCRIPTION

In the traditional method, there is a problem that even if the user is moving far away from the vehicle, the apparatus does not stop the transmission of the radio signal for unlocking the vehicle when the user is continuously moving, so that the relay attack cannot be sufficiently suppressed.

Therefore, an object of the present disclosure is to more reliably suppress a relay attack in the smart entry system.

Embodiments will be described with reference to the drawings. In the following description of the drawings, the same or similar parts are denoted by the same or similar reference symbols.

(Example of Smart Entry System)

Figure 1:
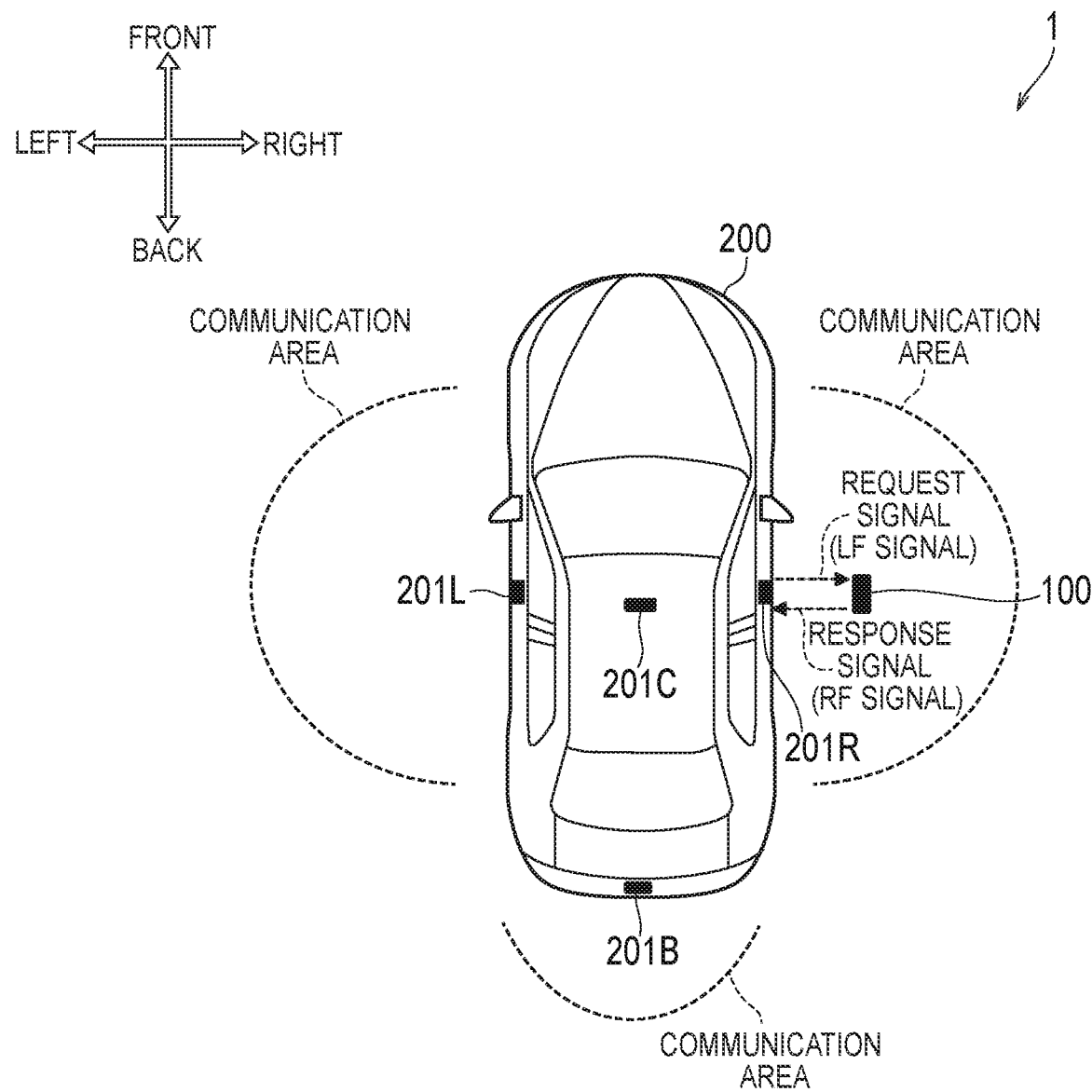
FIG. 1 is a diagram illustrating a smart entry system according to an embodiment.

FIG. 1 is a diagram illustrating a smart entry system 1 according to an embodiment.

In an embodiment, an automobile is exemplified as a vehicle 200, but the vehicle 200 may be a motorcycle or an automobile tricycle. Moreover, although an engine is illustrated as a power source of the vehicle 200, the power source of the vehicle 200 may be a motor.

As illustrated in FIG. 1, the smart entry system 1 performs two-way radio communication between an electronic key apparatus 100 possessed and carried by the user and the vehicle 200, and locks and unlocks the door of the vehicle 200. The electronic key apparatus 100 and the vehicle 200 store an identification code unique to the vehicle, and perform authentication by radio communication using the identification code.

The vehicle 200 includes, for example, a locking mechanism that locks and unlocks the door lock mechanism, an engine starting mechanism that starts the engine, and a radio communicator that is provided on a door knob on the outer surface of the door. In FIG. 1, an example is illustrated in which a vehicle 200 includes a radio communicator 201R provided on the right door, a radio communicator 201L provided on the left door, a radio communicator 201B provided on the rear door, and a radio communicator 201C provided on an inner surface of a vehicle ceiling.

The radio communicator 201C is used for the vehicle 200 to detect whether the electronic key apparatus 100 is present in the vehicle. Specifically, the electronic key apparatus 100 constantly transmits a weak radio signal having a reach distance of about 1 m. While the radio communicator 201C receives a radio signal from the electronic key apparatus 100, the vehicle 200 may determine that the electronic key apparatus 100 exists in the vehicle and may allow the engine to start. The vehicle 200 may automatically lock the door when the electronic key apparatus 100 does not exist in the vehicle for a certain period of time.

The radio communicators 201R, 201L, and 201B are used for locking and unlocking the door. For example, when the user operates a switch installed on the door knob of the right door of the vehicle 200, a low frequency (LF) signal as a request signal is transmitted from the radio communicator 201R.

Upon receiving this request signal, electronic key apparatus 100 returns a radio frequency (RF) signal including an identification code to vehicle 200 as a response signal. The RF signal is a high-frequency radio signal and has a longer reach distance than the LF signal.

The vehicle 200 verifies an identification code included in the response signal from the electronic key apparatus 100 against the identification code stored in advance by the vehicle 200, and locks and unlocks the door of the vehicle 200 if the verification is matched.

The distance in which two-way communication can be performed between the vehicle 200 and the electronic key apparatus 100 depends on the reach distance of the LF signal, and for example, the distance is about 1 m or about 2 m from each of the radio communicators 201R, 201L, and 201B. In FIG. 1, the area corresponding to the reach distances of the LF signals of radio communicators 201R, 201L, and 201B is illustrated as the communication area outside the vehicle 200.

In the smart entry system 1 configured as described above, there is a possibility that the identification code is collated by a method called the relay attack, and door unlocking and engine starting are performed.

Figure 2:
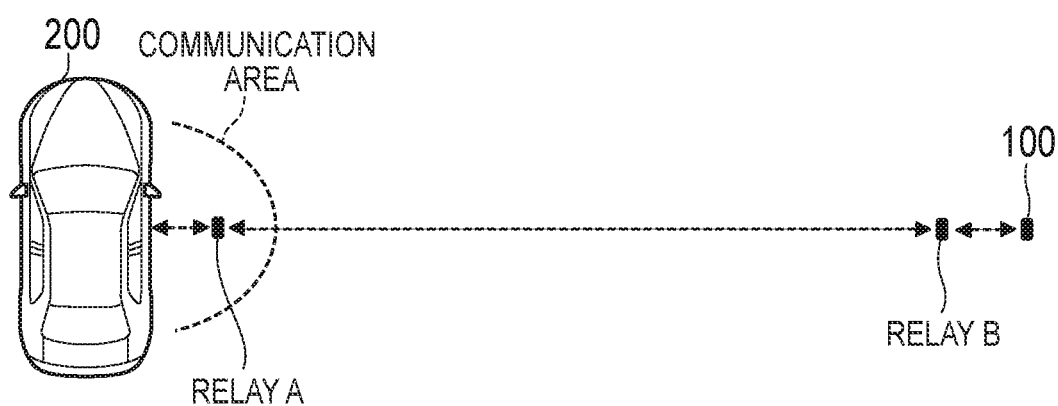
FIG. 2 is a diagram illustrating an example of a relay attack.

FIG. 2 is a diagram illustrating an example of a relay attack.

As illustrated in FIG. 2, the relay attack is an unauthorized technique in which even when there is an electronic key apparatus 100 at a distance where radio signal (LF signal) from the vehicle 200 does not reach, a malicious third party interposes a relay between the vehicle 200 and the electronic key apparatus 100, and unlocks the vehicle by enabling communication between the vehicle 200 and the electronic key apparatus 100.

When a user with the electronic key apparatus 100 is away from the vehicle 200, if a thief holding a relay A approaches the vehicle 200, and operates the switch on the door knob of the vehicle 200, a request signal (LF signal) is transmitted from the vehicle 200. The relay A receives this request signal, demodulates it, modulates it to an RF signal, and transmits the RF signal.

A relay B held by another thief receives this RF signal, demodulates it, and remodulates it to the request signal (LF signal). When the thief holding the relay B approaches the user, even if the user is away from the vehicle 200, the electronic key apparatus 100 receives the LF signal from the relay B at a short distance, and a response signal (RF signal) is transmitted.

Therefore, without the user performing the unlocking operation and the engine starting operation of the vehicle 200, and without noticed by the user, the vehicle 200 receives the RF signal containing a legitimate identification code, and the door can be unlocked and the engine can be started.

The electronic key apparatus 100 according to an embodiment includes a global navigation satellite system (GNSS) receiver and an acceleration sensor to suppress the relay attack in the smart entry system 1.

The electronic key apparatus 100 sets a transmission stop mode for stopping transmission of a radio signal for unlocking the vehicle 200 (that is, an RF signal as a response signal) based on the output of at least one of the GNSS receiver and the acceleration sensor.

For example, the electronic key apparatus 100 sets the transmission stop mode when the user is moving out from the vehicle 200, or the user is located far from the vehicle 200, and stops transmission of the radio signal for unlocking the vehicle 200.

(Electronic Key Apparatus)

Figure 3:
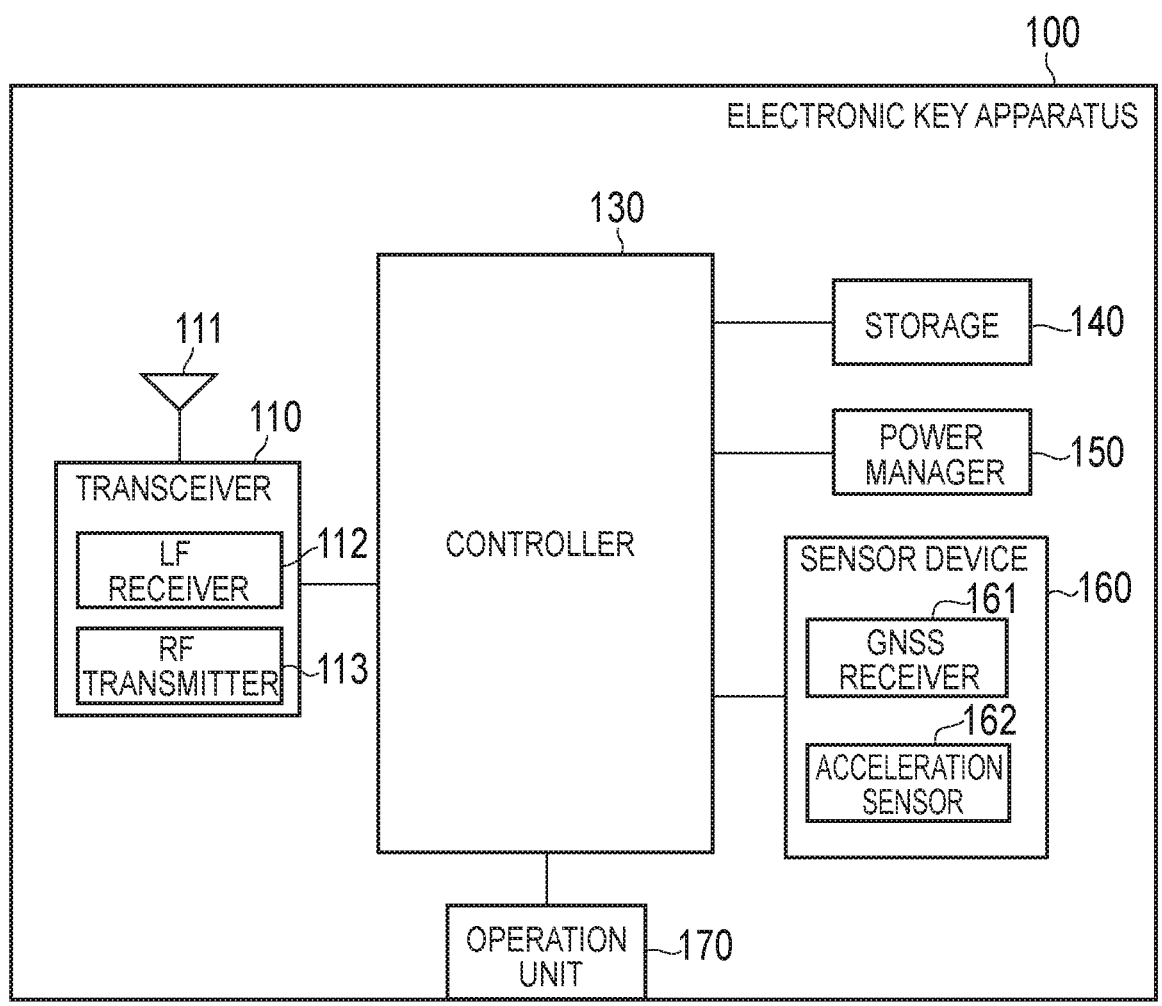
FIG. 3 is a diagram illustrating a configuration of an electronic key apparatus according to an embodiment.

FIG. 3 is a diagram illustrating a configuration of the electronic key apparatus 100 according to an embodiment.

As illustrated in FIG. 3, the electronic key apparatus 100 includes a transceiver 110, a controller 130, a storage unit 140, a power manager 150, a sensor device 160, and an operation unit 170.

Communication unit 110 performs radio communication with vehicle 200. The transceiver 110 includes an antenna 111, an LF receiver 112, and an RF transmitter 113.

The antenna 111 includes an LF reception antenna and an RF transmission antenna.

The LF receiver 112 performs amplification processing and filter processing on the LF signal received by the antenna 111, converts the LF signal into a baseband signal, and outputs the baseband signal to the controller 130.

The RF transmitter 113 converts the baseband signal input from the controller 130 into an RF signal, performs amplification processing, and transmits the RF signal from the antenna 111.

The controller 130 performs various processes and control in the electronic key apparatus 100. The controller 130 includes at least one processor. The processor includes a baseband processor and a central processing unit (CPU). The baseband processor performs baseband signal modulation/demodulation and the like. The CPU executes programs stored in the storage unit 140 to perform various processes.

The storage unit 140 includes a volatile memory and a nonvolatile memory. The storage unit 140 stores a program executed by the controller 130 and information used for processing by the controller 130. Storage unit 140 stores an identification code unique to the vehicle 200.

The power manager 150 includes a battery and its peripheral circuit. The power manager 150 supplies driving power for the electronic key apparatus 100. The battery may be a disposable type that can be attached to and detached from the electronic key apparatus 100, or may be a rechargeable storage battery (secondary battery).

The sensor device 160 includes a GNSS receiver 161 and an acceleration sensor 162.

The GNSS receiver 161 acquires position information indicating the position of the electronic key apparatus 100, and outputs the acquired position information to the controller 130. The GNSS receiver include at least one of a global positioning system (GPS) receiver, a global navigation satellite system (GLONASS) receiver, an Indian regional navigational satellite system (IRNSS) receiver, a COMPASS receiver, a Galileo receiver, and a quasi-zenith satellites system (QZSS) receiver.

The acceleration sensor 162 measures the acceleration applied to the electronic key apparatus 100 and outputs the measured acceleration to the controller 130. The acceleration sensor 162 may include a plurality of acceleration sensors for measuring the acceleration in the movement direction and in the vertical and horizontal directions of the electronic key apparatus 100.

The controller 130 may perform self-position detection by the acceleration sensor 162. The self-position detection can be performed even in the underground where the GNSS receiver 161 cannot catch the satellite signal. The controller 130 obtains the moving distance from the start position by continuing to integrate the acceleration information. Here, the shorter the interval for acquiring the acceleration information, the more accurately the distance can be obtained. However, since the error increases when the self-position detection by the acceleration sensor 162 is performed for a long time, it is preferable to appropriately perform correction by the position information of the GNSS receiver 161.

The operation unit 170 receives a locking operation/unlocking operation from a user and outputs a signal to the controller 130 according to the operation. When the operation unit 170 is operated, the controller 130 performs remote control operation by one-way communication. Specifically, when operation unit 170 is operated, controller 130 transmits an RF signal including an identification code stored in storage unit 140 via RF transmitter 113.

Further, when receiving a request signal from the vehicle 200 via the LF receiver 112, the controller 130 transmits the RF signal including the identification code as a response signal via the RF transmitter 113.

In the electronic key apparatus 100 configured as described above, the controller 130 controls whether to set a transmission stop mode in which the transceiver 110 stops transmission of a radio signal for unlocking the vehicle 200 based on the output of at least one of the GNSS receiver 161 and the acceleration sensor 162. The radio signal for unlocking the vehicle 200 refers to a radio signal (RF signal) including an identification code stored in the storage unit 140.

In the transmission stop mode, even when the controller 130 receives the request signal (LF signal) via the LF receiver 112, the controller 130 does not transmit a radio signal for unlocking the vehicle 200 via the RF transmitter 113. In the transmission stop mode, the controller 130 may stop the transmission operation of the RF transmitter 113 (that is, halt transmission), or stop the reception operation of the LF receiver 112.

However, even in the transmission stop mode, when the operation unit 170 is operated by the user, the controller 130 may control the RF transmitter 113 to transmit a radio signal for unlocking the vehicle 200.

Figure 4:
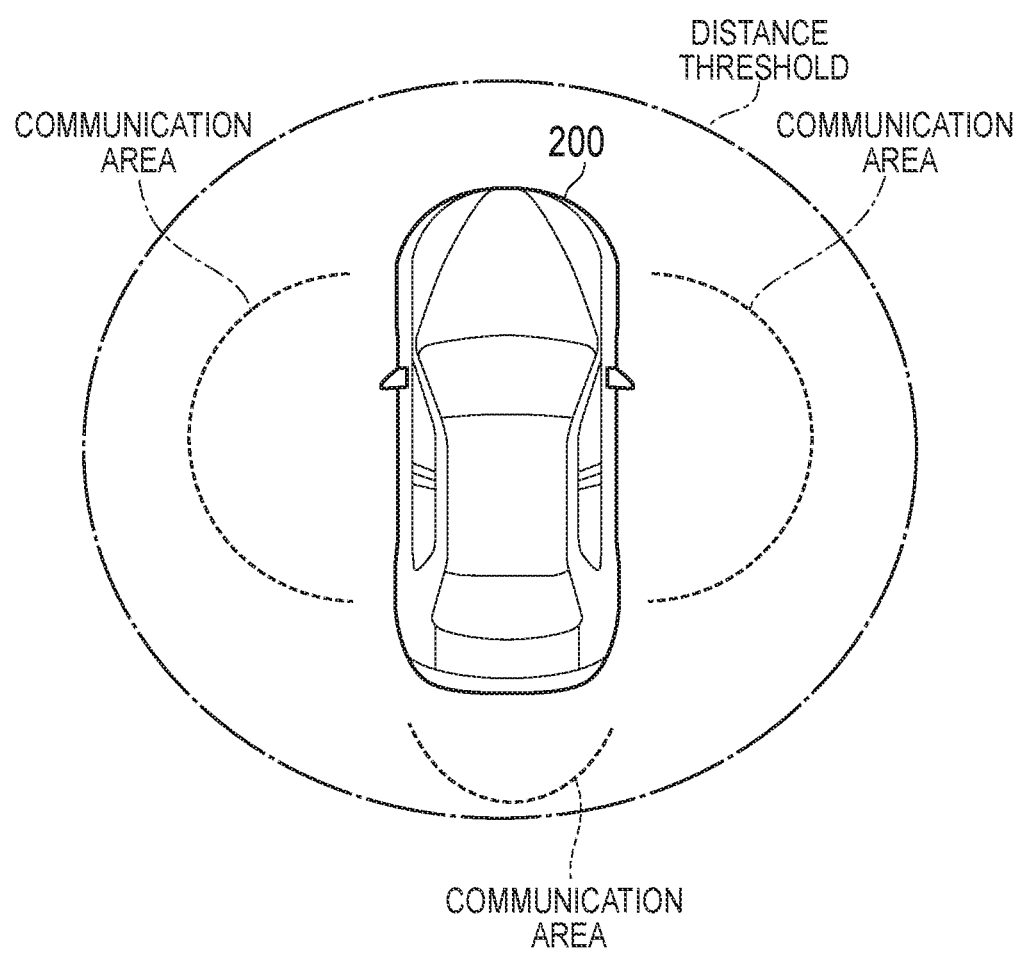
FIG. 4 is a diagram for explaining a control method by a controller according to an embodiment.

FIG. 4 is a diagram for explaining a control method by the controller 130 according to an embodiment.

When the transceiver 110 performs radio communication with the vehicle 200 in order to lock the vehicle 200, the controller 130 may specifies the position of the electronic key apparatus 100 when the vehicle 200 is locked as the stopping position of the vehicle 200. For example, after the user stops the vehicle 200, when the user operates the door knob switch of the vehicle 200 to lock the vehicle 200, the controller 130 specifies and stores the position at this time as the stopping position. Alternatively, when the vehicle 200 constantly transmits a weak LF signal, when the electronic key apparatus 100 cannot receive the LF signal, the controller 130 may specify and store the position at this time as the stopping position.

When the transceiver 110 performs radio communication with the vehicle 200, the controller 130 may specify and store the position of the electronic key apparatus 100 when the engine (power source) of the vehicle 200 is stopped as a stopping position. Communication unit 110 may perform radio communication with vehicle 200 in order to stop the engine of vehicle 200.

The controller 130 may set the transmission stop mode in response to the electronic key apparatus 100 starting to move after the vehicle 200 is stopped or locked. As a result, it is possible to suppress the relay attack when the user gets off the vehicle 200 and starts walking.

The controller 130 may set the transmission stop mode in a moving state which occurs after the electronic key apparatus 100 starts moving after the vehicle 200 stops or is locked until the electronic key apparatus 100 stops moving. As a result, it is possible to suppress the relay attack when the user gets off the vehicle 200 and walks toward the target location.

The controller 130 may set the transmission stop mode in response to the distance between the stopping position of the vehicle 200 and the current position of the electronic key apparatus 100 exceeding the distance threshold. Here, the distance threshold is a value that is equal to or greater than the reach distance of the radio signal (LF signal) that the vehicle 200 transmits to the electronic key apparatus 100. FIG. 4 illustrates an example in which the distance threshold is set to a value larger than the communication area corresponding to the distance threshold of the LF signal.

Even when the distance between the stopping position of the vehicle 200 and the current position of the electronic key apparatus 100 is equal to or less than the distance threshold, the controller 130 may set the transmission stop mode when the electronic key apparatus 100 remains stationary for a certain period of time after the vehicle 200 is stopped or locked.

Accordingly, it is possible to suppress the relay attack when for example, when the user's home is around the vehicle 200 and the electronic key apparatus 100 is placed at the home.

Further, the controller 130 may cancel the transmission stop mode in response to the distance between the stopping position of the vehicle 200 and the current position of the electronic key apparatus 100 being equal to or less than the distance threshold. Thereby, when the user returns to the vehicle 200, it is possible to unlock the car using the electronic key apparatus 100.

When the electronic key apparatus 100 is stationary, the controller 130 may cancel the transmission stop mode when the distance between the stopping position of the vehicle 200 and the current position of the electronic key apparatus 100 is equal to or less than the distance threshold, and when the electronic key apparatus 100 is moved again and is moved to the stopping position. Thereby, it is possible to unlock the car using the electronic key apparatus 100 even when the user stops moving in the vicinity of the vehicle 200 after the start of walking and returns to the vehicle 200. Here, the controller 130 may measure walking information before stopping moving (walking distance, number of steps, walking time), and may cancel the transmission stop mode when the walking information after stopping moving becomes equivalent to the walking information before stopping.

The controller 130 may cancel the transmission stop mode when the distance is equal to or less than the distance threshold after the distance between the stopping position of the vehicle 200 and the current position of the electronic key apparatus 100 exceeds the distance threshold in a moving state. Thereby, it is possible to unlock the car using the electronic key apparatus 100 even when the user returns to the vehicle 200 without stopping from the start of walking (Example of Control Flow of Controller)

Figure 5:
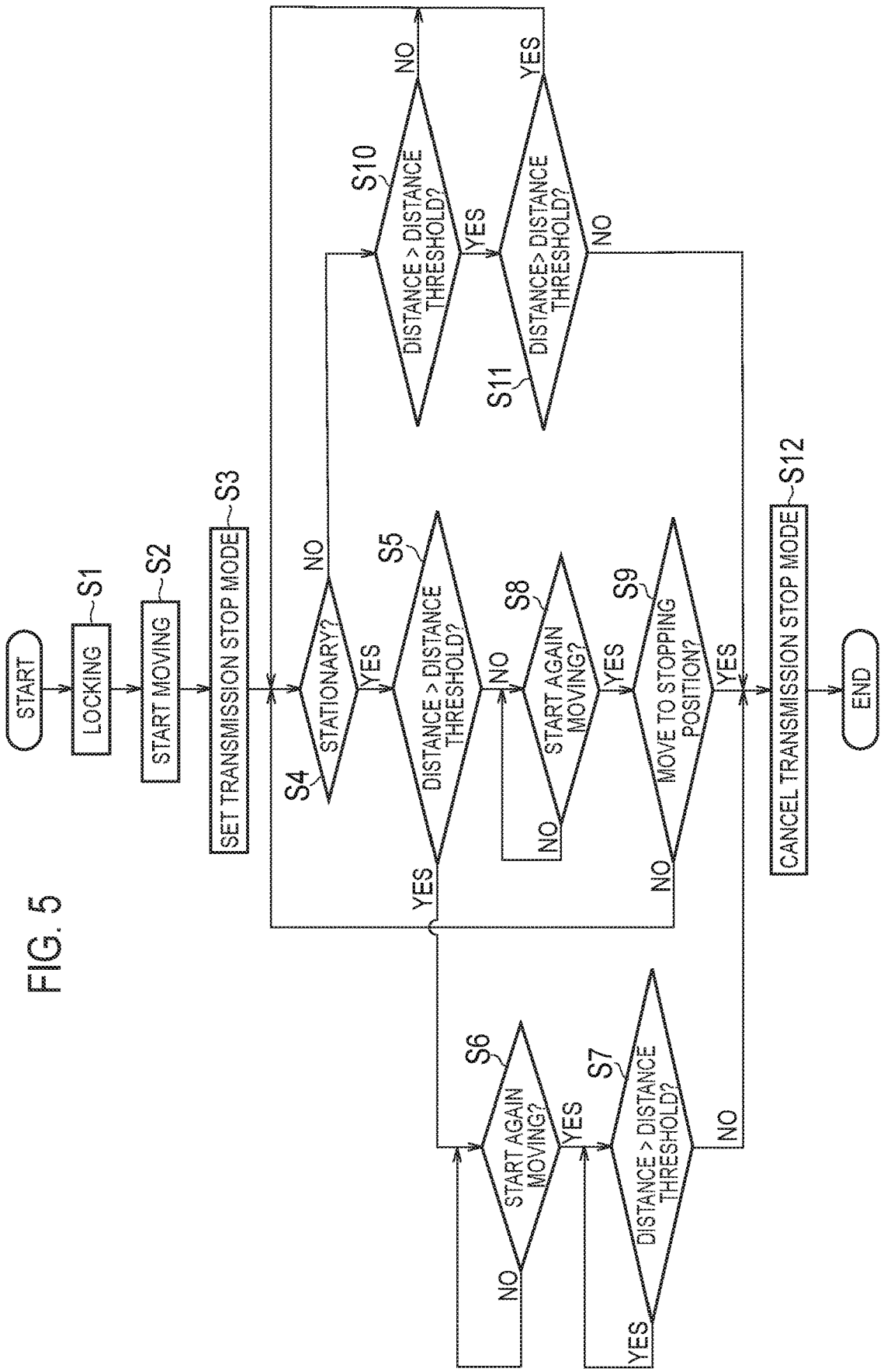
FIG. 5 is a diagram illustrating a control flow example 1 of a controller according to an embodiment.

FIG. 5 is a diagram illustrating a control flow example 1 of the controller 130 according to an embodiment.

As illustrated in FIG. 5 in step S1, based on the radio communication with the vehicle 200 or the output of the sensor device 160, the controller 130, detects the stopping and/or locking of the vehicle 200, and stores the position at this time as a stopping position.

In step S2, the controller 130 detects the start of movement of the electronic key apparatus 100 based on the output of sensor device 160.

In step S3, the controller 130 sets the transmission stop mode in response to the detection of the start of movement of the electronic key apparatus 100.

In step S4, the controller 130 validates whether the electronic key apparatus 100 is stationary based on the output of the sensor device 160.

When the electronic key apparatus 100 is stationary (step S4: YES), in step S5, the controller 130 validates whether the distance between the stopping position of the vehicle 200 and the current position of the electronic key apparatus 100 exceeds the distance threshold.

When the distance between the stopping position of the vehicle 200 and the current position of the electronic key apparatus 100 exceeds the distance threshold (step S5: YES), in step S6, the controller 130 validates whether the electronic key apparatus 100 is moved again. When the electronic key apparatus 100 is moved again (step S6: YES), and when the distance between the stopping position of the vehicle 200 and the current position of the electronic key apparatus 100 is equal to or less than the distance threshold (step S7: NO), the controller 130 cancels the transmission stop mode (Step S12).

In this way, when the electronic key apparatus 100 is stationary (step S4: YES), when the distance between the stopping position of the vehicle 200 and the current position of the electronic key apparatus 100 exceeds the distance threshold (step S5: YES), when the electronic key apparatus 100 is moved again (step S6: YES), and when the distance between the stopping position of the vehicle 200 and the current position of the electronic key apparatus 100 is equal to or less than the distance threshold (step S7: NO), the controller 130 cancels the transmission stop mode (step S12).

On the other hand, when the distance between the stopping position of the vehicle 200 and the current position of the electronic key apparatus 100 when the electronic key apparatus 100 is stationary is equal to or less than the distance threshold (step S5: NO), in step S8 the controller 130 validates whether the electronic key apparatus 100 is moved again.

When the electronic key apparatus 100 is moved again (step S8: YES), in step S9, the controller 130 validates whether the electronic key apparatus 100 is moved to the stopping position. When the electronic key apparatus 100 is not moved to the stopping position (step S9: NO), the controller 130 returns the process to step S4.

When the electronic key apparatus 100 is moved to the stopping position (step S9: YES), in step S12, the controller 130 cancels the transmission stop mode.

In this way, when the distance between the stopping position of the vehicle 200 and the current position of the electronic key apparatus 100 is equal to or less than the distance threshold (step S5: NO) when the electronic key apparatus 100 is stationary (step S4: YES), the controller 130 cancels the transmission stop mode (step S12) when the electronic key apparatus 100 is moved again (step S8: YES) and is moved to the stopping position (step S9: YES). In other words, even if the distance between the stopping position of the vehicle 200 and the current position of the electronic key apparatus 100 is equal to or less than the distance threshold when the electronic key apparatus 100 is stationary, the controller 130 does not cancel the transmission stop mode until the electronic key apparatus 100 is moved again.

On the other hand, when the electronic key apparatus 100 is not is stationary (step S4: NO), and when the distance between the stopping position of the vehicle 200 and the current position of the electronic key apparatus 100 exceeds the distance threshold (step S10: YES), the controller 130 cancels the transmission stop mode (step S12) when the distance between the stopping position of the vehicle 200 and the current position of the electronic key apparatus 100 is equal to or less than the distance threshold (step S11: NO).

Figure 6:
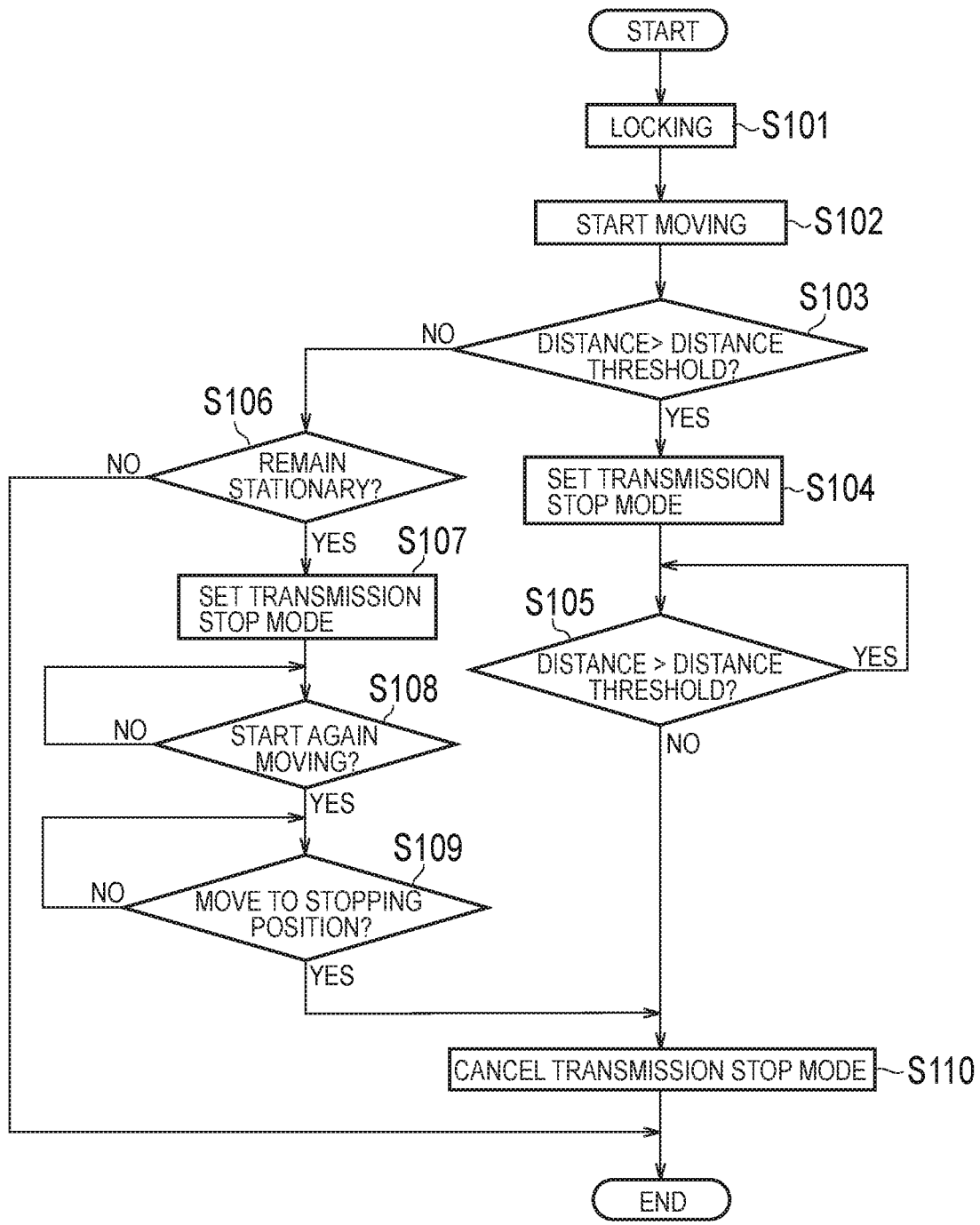
FIG. 6 is a diagram illustrating a control flow example 2 of the controller according to an embodiment.

FIG. 6 is a diagram illustrating a control flow example 2 of the controller 130 according to an embodiment. Here, the difference from the above-described control flow example 1 will be mainly described.

As illustrated in FIG. 6, the controller 130 detects the stop and/or locking of the vehicle 200, and stores the position at this time as the stopping position (step S101). After the electronic key apparatus 100 starts moving (step S102), in step S103 the controller 130 validates whether the distance between the stopping position of the vehicle 200 and the current position of the electronic key apparatus 100 has exceeded the distance threshold.

When the distance between the stopping position of the vehicle 200 and the current position of the electronic key apparatus 100 exceeds the distance threshold (step S103: YES), in step S104, the controller 130 sets the transmission stop mode. That is the controller 130 detects the distance between the stopping position of the vehicle 200 and the current position of the electronic key apparatus 100 exceeds the distance threshold based on the output of sensor device 160, and sets the transmission stop mode in response to the detection. Afterwards, when the distance between the stopping position of the vehicle 200 and the current position of the electronic key apparatus 100 is equal to or less than the distance threshold (step S105: NO), in step S110, the controller 130 cancels the transmission stop mode.

On the other hand, when the distance between the stopping position of the vehicle 200 and the current position of the electronic key apparatus 100 is equal to or less than the distance threshold (step S103: NO), in step S106, the controller 130 validates whether the electronic key apparatus 100 remains stationary for a certain period of time. When electronic key apparatus 100 remains stationary for a certain period of time (step S106: YES), in step S107, controller 130 sets the transmission stop mode. Then, when the electronic key apparatus 100 is moved again (step S108) and is moved to the stopping position (step S109: YES), the controller 130 cancels the transmission stop mode (step S110).

(First Modification of Electronic Key Apparatus)

Figure 7:
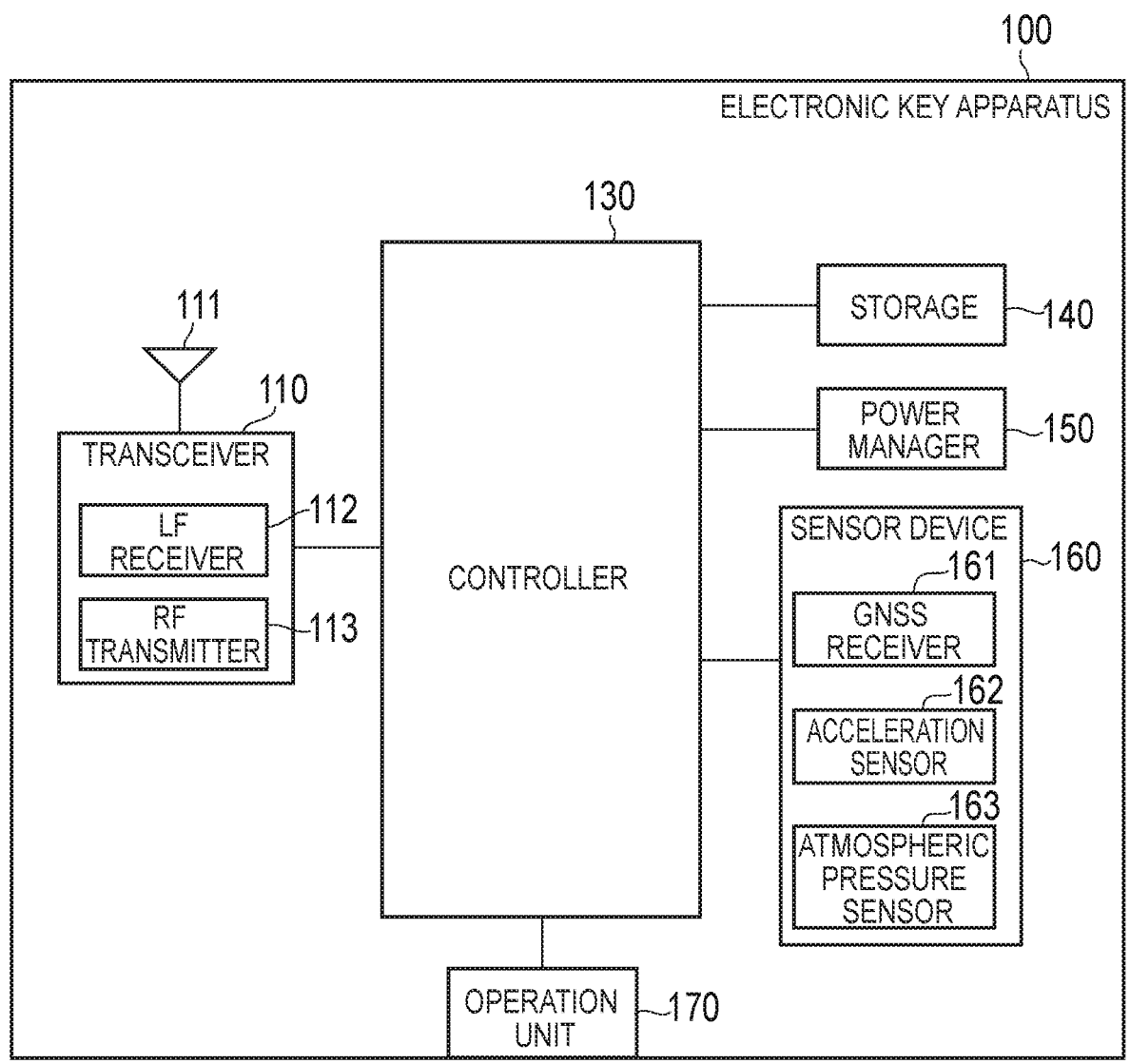
FIG. 7 is a diagram illustrating a first modification of the electronic key apparatus according to an embodiment.

FIG. 7 is a diagram illustrating a first modification of the electronic key apparatus 100 according to an embodiment. In the first modification, it is assumed that the user moves between the floors after stopping the car in a multi-story facility.

As illustrated in FIG. 7, in the electronic key apparatus 100 according to the first modification, the sensor device 160 further includes an atmospheric pressure sensor 163. Based on the output of the atmospheric pressure sensor 163, the controller 130 calculates the atmospheric pressure difference between the atmospheric pressure at the stopping position of vehicle 200 and the current atmospheric pressure. Here, the atmospheric pressure changes by 1 hPa for about 9 m. Assuming that the resolution of the atmospheric pressure sensor 163 is about 0.01 hPa, the movement between the floors can be detected.

Then, when the atmospheric pressure difference is larger than the atmospheric pressure difference threshold, the controller 130 sets the transmission stop mode regardless of the distance between the stopping position of the vehicle 200 and the current position of the electronic key apparatus 100. Here, the atmospheric pressure difference threshold is set in advance so as to be a value of an atmospheric pressure difference which can be recognized as having moved from a floor where the vehicle 200 is stopped to another floor. The controller 130 may use the output of the acceleration sensor 162 in combination to determine whether there has been a stair climb or escalator/elevator movement.

Further, the controller 130 may cancel the transmission stop mode when the calculated atmospheric pressure difference is less than or equal to the atmospheric pressure difference threshold, and when the distance between the stopping position of the vehicle 200 and the current position of the electronic key apparatus 100 is equal to or less than the distance threshold.

(Second Modification of Electronic Key Apparatus)

Figure 8:
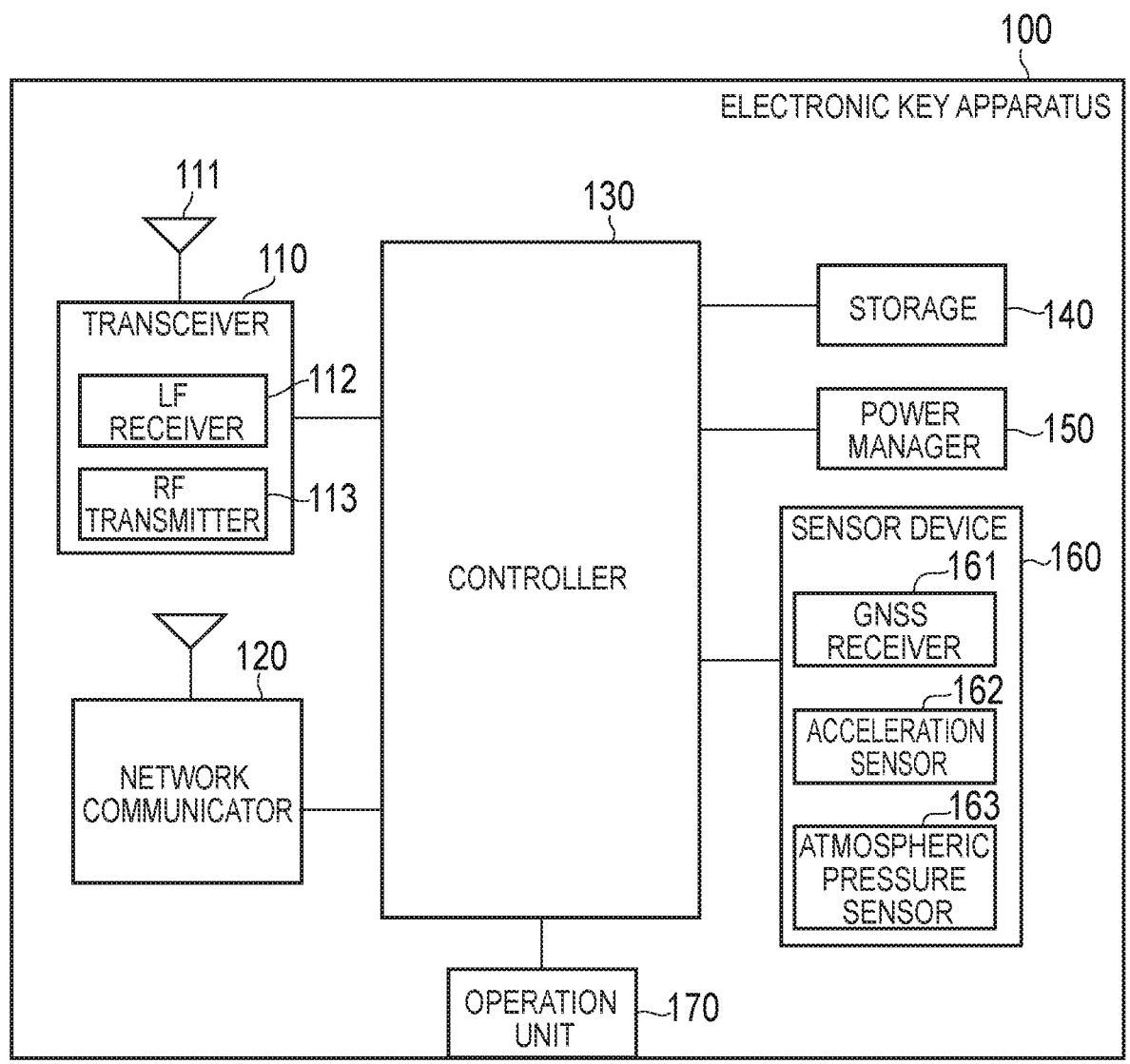
FIG. 8 is a diagram illustrating a second modification of the electronic key apparatus according to an embodiment.

FIG. 8 is a diagram illustrating a second modification of the electronic key apparatus 100 according to an embodiment. In the second modification, it is assumed that the electronic key apparatus 100 is compatible with radio communication with a communication network.

As illustrated in FIG. 8, the electronic key apparatus 100 according to the second modification further includes a network transceiver 120 configured to perform radio communication with a communication network. The network transceiver 120 may perform low power wide area (LPWA) radio communication with a communication network. The LPWA method is a method for realizing long-distance radio communication while suppressing power consumption. The LPWA method is, for example, a cellular LPWA, a SIGFOX, or a LoRaWAN.

The controller 130 may acquire GNSS trajectory information (ephemeris) via the network transceiver 120, or may perform the network-assisted GNSS positioning. This enables the GNSS positioning with high speed and high accuracy.

Further, the controller 130 may acquire the identification information of the base station in which the electronic key apparatus 100 exists via the network transceiver 120. After the controller 130 stores the base station identification information when the vehicle 200 is stopped, it may stop the GNSS positioning when the electronic key apparatus 100 is moved to a position far away from the vehicle 200, and is moved to another base station area. Since the power consumption of the GNSS receiver 161 is large, an increase in power consumption can be suppressed by turning off the GNSS receiver 161 when the GNSS receiver 161 is far away so that the base station is changed.

Further, the controller 130 may acquire weather information or atmospheric pressure information via the network transceiver 120 in order to correct the influence of the weather on the atmospheric pressure measured by the atmospheric pressure sensor 163. Then, when determining that the user has returned to the same floor, the controller 130 absorbs the change in the atmospheric pressure due to the weather by correction.

Other Embodiment

In the embodiment described above, an example in which the vehicle 200 has a door has been described. However, the vehicle 200 may be a vehicle that does not have a door (for example, a motorcycle). By applying, to the motorcycle that is provided with the smart entry system, the operation according to the embodiment described above, a thief can be prevented from starting a motorcycle engine by a relay attack.

A program for causing a computer to execute each process performed by the electronic key apparatus 100 may be provided. The program may also be recorded on a computer readable medium. Use of a computer readable medium makes it possible to install a program in a computer. Here, the computer readable medium on which the program is recorded may be a non-transitory recording medium. The non-transitory recording medium is not is not specific, but it may be a recording medium such as CD-ROM or DVD-ROM, for example.

Although the embodiments have been described in detail with reference to the drawings, the specific configuration is not limited to the above-described configuration, and various design changes and the like can be made without departing from the scope of the invention.

The invention claimed is:

1. An electronic key apparatus used by a user of a vehicle in a smart entry system, the electronic key apparatus comprising:
    a transceiver configured to perform a radio communication with the vehicle;
    a sensor device including at least one of a GNSS (Global Navigation Satellite System) receiver and an acceleration sensor; and
    a controller configured to control whether to set a transmission stop mode based on an output of at least one of the GNSS receiver and the acceleration sensor, the transmission stop mode being for causing the transceiver to stop transmission of a radio signal used for unlocking the vehicle or starting a power source of the vehicle, wherein
    the controller is configured to;
        detect a predetermined state based on the output of at least one of the GNSS receiver and the acceleration sensor; and
        set the transmission stop mode in response to detecting the predetermined state.

2. The electronic key apparatus according to claim 1, wherein
    the predetermined state includes a state that the electronic key apparatus starts moving after the vehicle is stopped or locked.

3. The electronic key apparatus according to claim 2, wherein
after the electronic key apparatus starts moving, the controller is further configured to determine that the electronic key apparatus is stationary, and a distance between a stopping position of the vehicle and a current position of the electronic key apparatus exceeds a distance threshold, and
after the determination, the controller is further configured to cancel the transmission stop mode when the electronic key apparatus starts again moving and the distance is equal to or less than the distance threshold.

4. The electronic key apparatus according to claim 3, wherein
after the electronic key apparatus starts moving, the controller is further configured to determine that the electronic key apparatus is stationary, and the distance is equal to or less than the distance threshold,
after the determination, the controller is further configured to cancel the transmission stop mode when the electronic key apparatus starts again moving and moves to the stopping position.

5. The electronic key apparatus according to claim 3, wherein
after the electronic key apparatus starts moving, the controller is further configured to determine that the electronic key apparatus is not stationary, and the distance is equal to or less than the distance threshold after the distance exceeds the distance threshold,
in response to the determination, the controller is further configured to cancel the transmission stop mode.

6. The electronic key apparatus according to claim 3, wherein
the distance threshold is a value equal to or greater than a reach distance of a radio signal transmitted from the vehicle to the electronic key apparatus.

7. The electronic key apparatus according to claim 3, wherein
the transceiver is configured to perform the radio communication with the vehicle in order to lock the vehicle, and
the controller is further configured to specify, as the stopping position of the vehicle, a position of the electronic key apparatus when the vehicle is locked.

8. The electronic key apparatus according to claim 3, wherein
the transceiver is configured to perform the radio communication with the vehicle in order to stop the power source of the vehicle, and
the controller is further configured to specify, as the stopping position, a position of the electronic key apparatus when the power source of the vehicle is stopped.

9. The electronic key apparatus according to claim 3, wherein
the sensor device further includes an atmospheric pressure sensor,
the controller is further configured to calculate an atmospheric pressure difference between an atmospheric pressure at the stopping position of the vehicle and a current atmospheric pressure based on an output of the atmospheric pressure sensor, and
the predetermined state includes a state that regardless of the distance, the atmospheric pressure difference is greater than an atmospheric pressure difference threshold.

10. The electronic key apparatus according to claim 1, wherein
the predetermined state includes a state that a distance between a stopping position of the vehicle and a current position of the electronic key apparatus exceeds a distance threshold.

11. The electronic key apparatus according to claim 10, wherein
even when the distance is equal to or less than the distance threshold, the controller is further configured to set the transmission stop mode in response to the electronic key apparatus remaining stationary for a certain period of time after the vehicle is stopped or locked.

12. The electronic key apparatus according to claim 11, wherein
the controller is further configured to cancel the transmission stop mode when the electronic key apparatus starts again moving and moves to the stopping position.

13. The electronic key apparatus according to claim 10, wherein
the controller is further configured to cancel the transmission stop mode in response to the distance being equal to or less than the distance threshold.

14. The electronic key apparatus according to claim 10, wherein
the distance threshold is a value equal to or greater than a reach distance of a radio signal transmitted from the vehicle to the electronic key apparatus.

15. The electronic key apparatus according to claim 10, wherein
the transceiver is configured to perform the radio communication with the vehicle in order to lock the vehicle, and
the controller is further configured to specify, as the stopping position of the vehicle, a position of the electronic key apparatus when the vehicle is locked.

16. The electronic key apparatus according to claim 10, wherein
the transceiver is configured to perform the radio communication with the vehicle in order to stop the power source of the vehicle, and
the controller is further configured to specify, as the stopping position, a position of the electronic key apparatus when the power source of the vehicle is stopped.

17. The electronic key apparatus according to claim 10, wherein
the sensor device further includes an atmospheric pressure sensor,
the controller is further configured to calculate an atmospheric pressure difference between an atmospheric pressure at the stopping position of the vehicle and a current atmospheric pressure based on an output of the atmospheric pressure sensor, and
the predetermined state includes a state that regardless of the distance, the atmospheric pressure difference is greater than an atmospheric pressure difference threshold.

18. A method of controlling an electronic key apparatus used by a user of a vehicle in a smart entry system, the electronic key apparatus including a transceiver configured to perform a radio communication with the vehicle, and a sensor device including at least one of a GNSS (Global Navigation Satellite System) receiver and an acceleration sensor, the method comprising:
controlling whether to set a transmission stop mode based on an output of at least one of the GNSS receiver and the acceleration sensor, the transmission stop mode being for causing the transceiver to stop transmission of a radio signal used for unlocking the vehicle or starting a power source of the vehicle, wherein the controlling includes:
   detecting a predetermined state based on the output of at least one of the GNSS receiver and the acceleration sensor; and
   setting the transmission stop mode in response to detecting the predetermined state.

19. A non-transitory computer-readable medium for storing a program causing the electronic key apparatus to perform the method according to claim 18.

* * * * *